May 22, 1951  R. L. CAMILLY ET AL  2,553,746
FRONT AXLE SUSPENSION ASSEMBLY
Filed June 12, 1947  3 Sheets-Sheet 1

INVENTORS
ROGER L. CAMILLY
ORPHEUS F. QUARTULLO
BY Hyde, Meyer, Baldwin & Doran
ATTORNEYS May 22, 1951  R. L. CAMILLY ET AL  2,553,746
FRONT AXLE SUSPENSION ASSEMBLY
Filed June 12, 1947  3 Sheets-Sheet 3

INVENTORS
ROGER L. CAMILLY
ORPHEUS F. QUARTULLO
By Hyde, Meyer, Baldwin & Doran
ATTORNEYS Patented May 22, 1951

2,553,746

UNITED STATES PATENT OFFICE 2,553,746

FRONT AXLE SUSPENSION ASSEMBLY

Roger L. Camilly, Cleveland, and Orpheus F. Quartullo, South Euclid, Ohio, assignors to The Euclid Road Machinery Co., Euclid, Ohio, a corporation of Ohio Application June 12, 1947, Serial No. 754,142

6 Claims. (Cl. 280—124)

The invention relates mainly to improvements in spring suspension and steering mechanism for power driven vehicles. While capable of general application to internal combustion engine powered vehicles for land and road use, the invention will be described with particular relation to the front end spring suspension, stabilization, and steering mechanism for a truck.

An object of the invention is to provide novel and improved transverse spring suspension means for a vehicle.

A further object of the invention is to provide a pair of cooperating semielliptic springs, coupled to work as a unit but disposed transversely one on each side of and parallel to a vehicle axle.

A further object of the invention is to provide novel and improved stabilizing means for maintaining controlled lateral alignment between the axle and the linked mid points of the pair of springs defined in the last preceding paragraph while permitting relative vertical movement between said mid points and said axle.

A further object of the invention is to provide a spring suspension and stabilizing means as specified in the last two preceding paragraphs, wherein the stabilizing means is of relatively elongated type having one end thereof pivotally attached to the axle, and the other end thereof pivotally attached to the linked mid-point of the springs.

A further object of the invention is to provide a front end suspension comprising a front axle, a frame resiliently suspended above said axle and having a front end portion extending forwardly from said axle, a universal ball pivot joint on the front end of said frame, and rigid means having the rear end thereof fixedly attached to spaced points on said axle, and having the front end thereof pivotally carried on said universal joint.

A further object of the invention is to provide a front end suspension of the character described in the last preceding paragraph, and wherein the said rigid means comprises a V-shaped structure having the apex thereof pivotally attached to said ball-joint, and the two leg ends fixedly attached to spaced points on the said axle.

A further object of the invention is to provide V-shaped, forwardly converging rigid means of the character defined in the last preceding paragraph, said means being hereinafter sometimes termed a "wishbone," said wishbone being provided with depending scraper means for removing dirt or similar loose material from in front of the vehicle during movement thereof.

A further object of the invention is to provide forwardly converging wishbone means of the character described, in combination with the pair of linked, cooperating transverse springs also as previously defined, and wherein the ball jointed front connection of the wishbone is in linear alignment with the common suspension axis of the springs.

A further object of the invention is to provide, in combination, novel front end suspension and steering means, said suspension comprising a pair of linked semielliptical springs transversely straddling the front axle and supporting the vehicle frame on the aligned mid points thereof, and a steering linkage comprising a front drag link operatively associated with the steering knuckle, a rear drag link operatively associated with the steering gear connecting rod, and an intermediate rocking lever pivotally connected at its respectively opposed ends to said front and rear drag links, said intermediate lever being swingable around a mid point which is pivotally fixed with respect to said vehicle frame.

A further object of the invention is to provide a front suspension and steering mechanism of the type defined in the last preceding paragraph wherein the pivot connection between the steering gear connecting rod and the intermediate rocking lever is in linear alignment with the aligned mid points of the pair of transverse springs when the vehicle is running in a straight forward direction.

Other objects and advantages including further novel features of the invention will be apparent from the accompanying drawings and specification, and the essential features thereof will be set forth in the appended claims.

Figure 2:
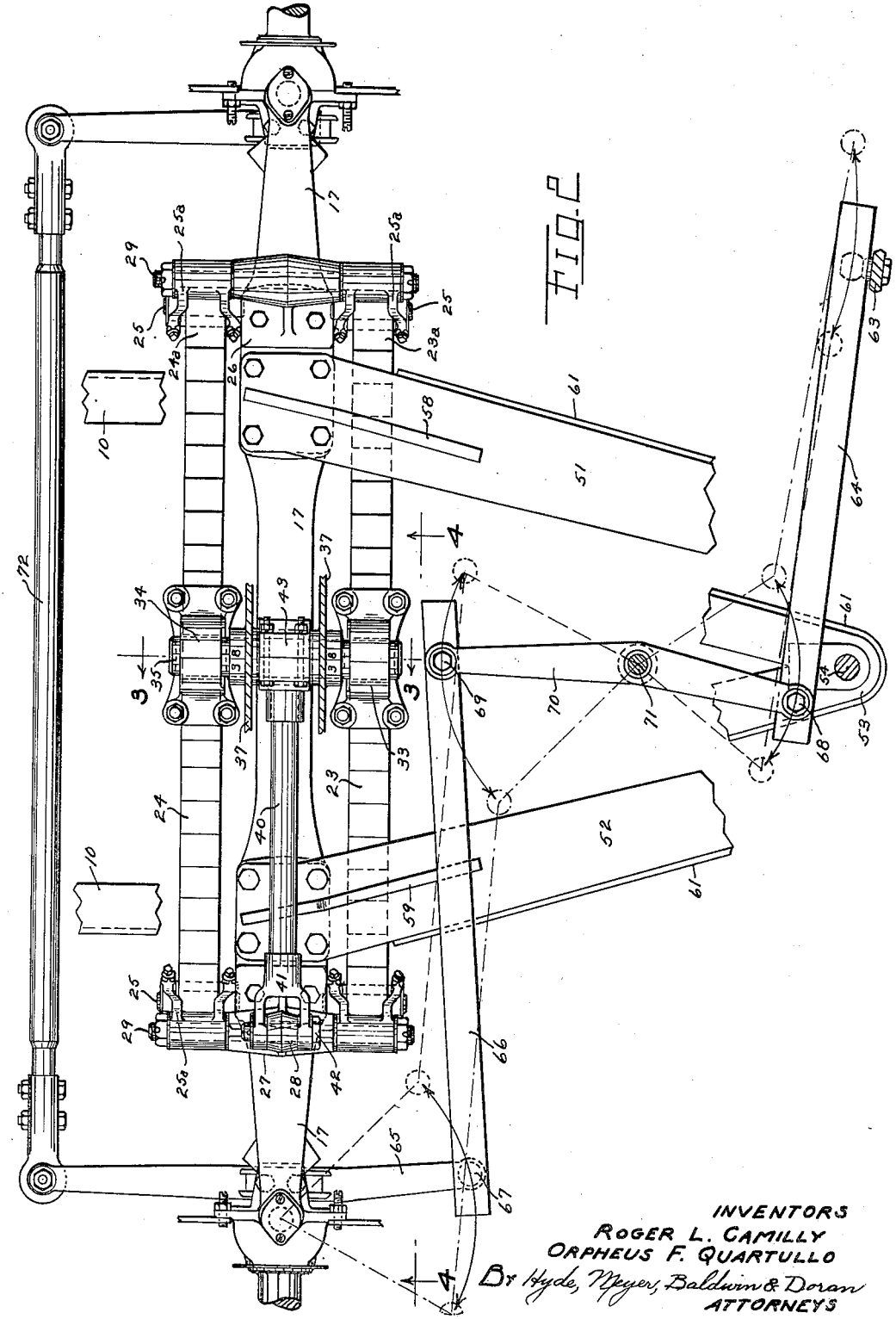
Fig. 2 is a detailed sectional view, somewhat enlarged, taken on the line 2—2 of Fig. 1.
Figure 3:
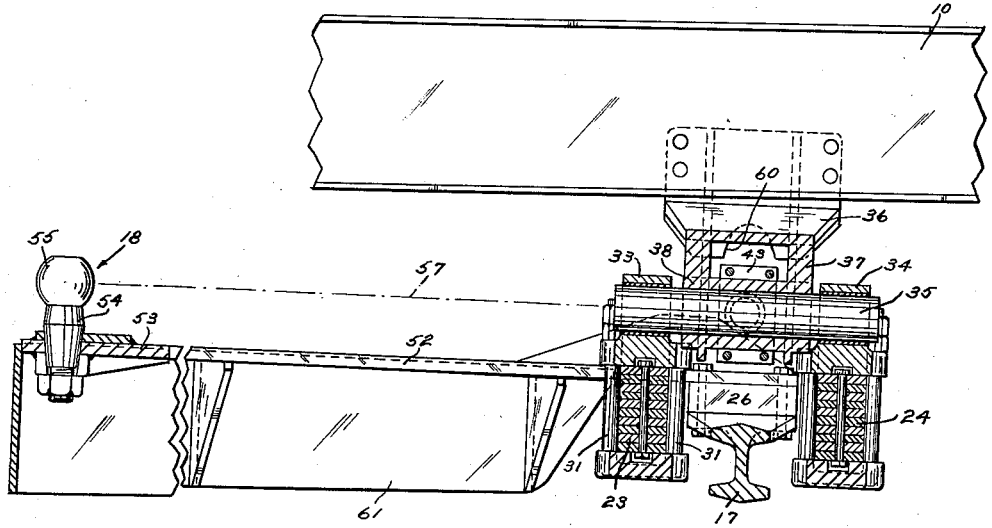
Figure 4:
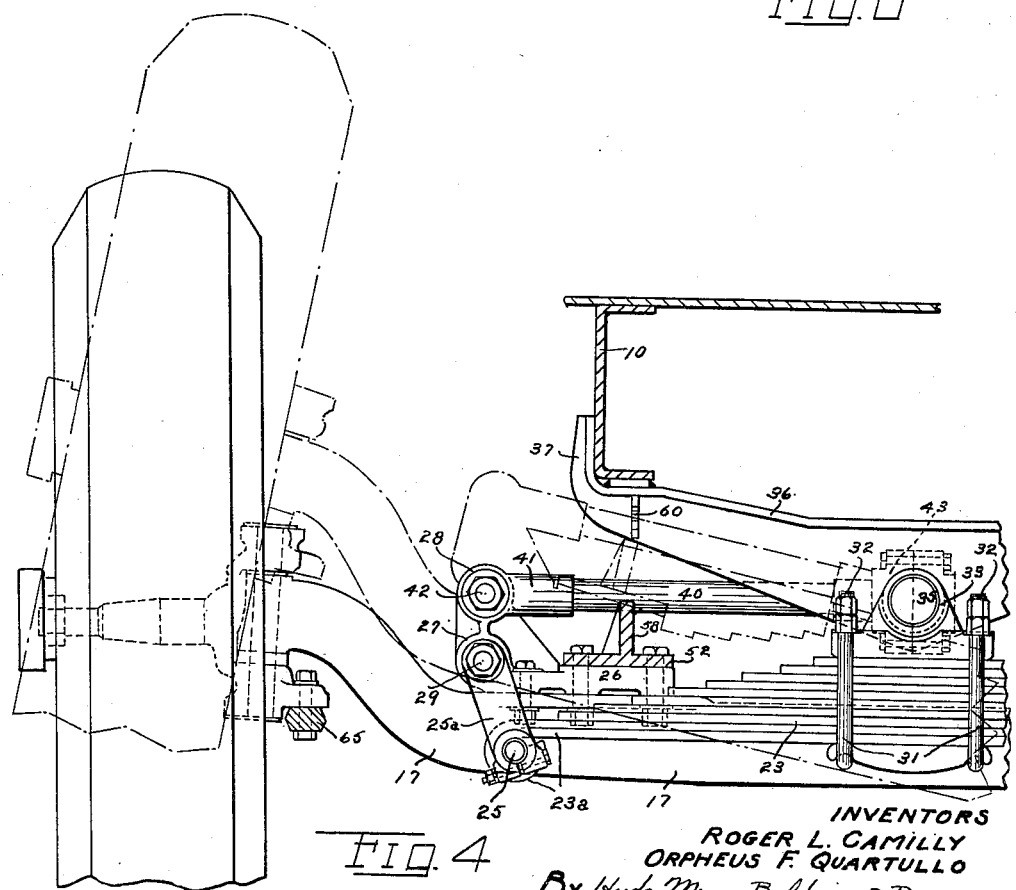

Figs. 3 and 4 are sectional views taken on the lines 3—3 and 4—4 of Fig. 2.

It will be apparent, as the description proceeds, that the inventive features illustrated and described herein are especially adapted to solve problems arising in the operation of heavy duty vehicles over rough roads or uneven terrain. Under such conditions the spring suspension and steering mechanism of the vehicle are subjected to severe shocks and strains. In the structure now to be described material improvements have been made in both the spring suspension and steering linkage, whereby severe shocks are absorbed by novel means, the tractive effect is applied to the front axle by novel structure, and operation of the steering wheel is effected without abnormal operating effort. It will be apparent that the features herein disclosed are applicable to various types of land and road vehicles.

Figure 1:
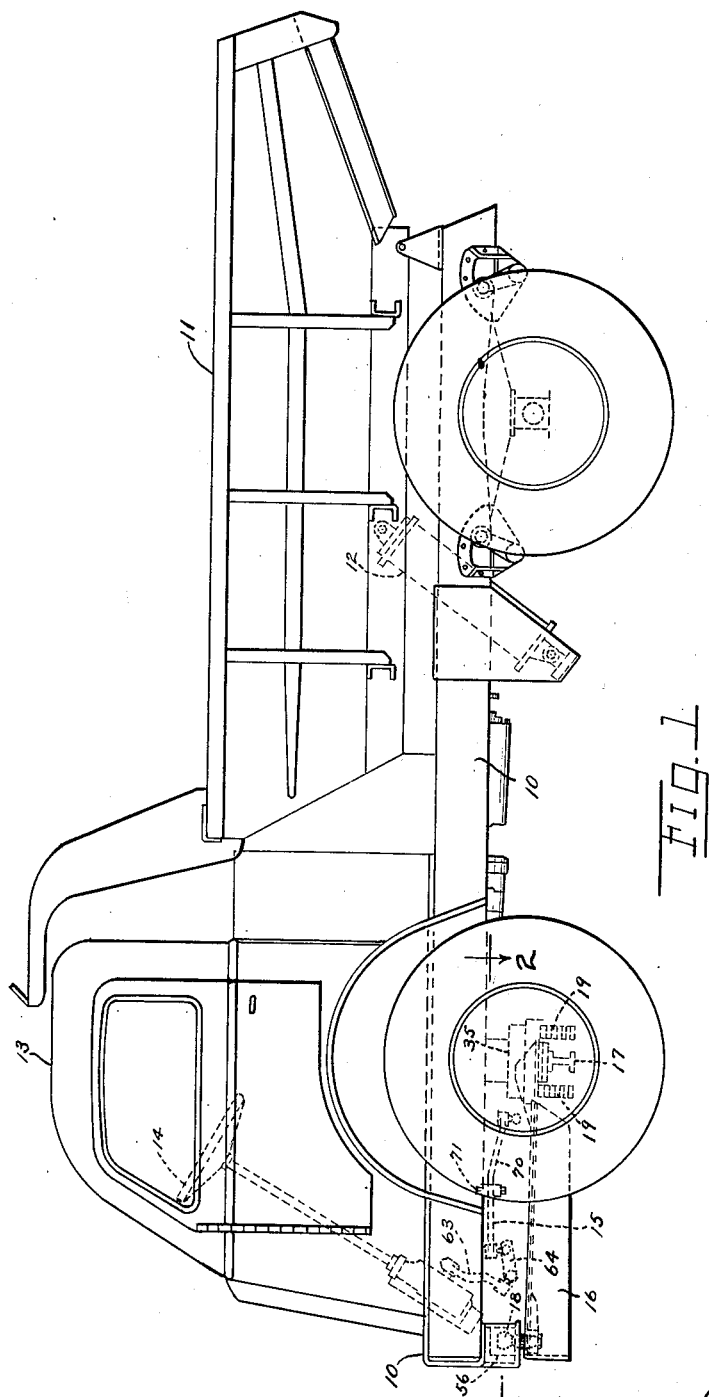
Fig. 1 is a side elevational view of a heavy duty dump truck equipped with a front end suspension and steering linkage embodying my invention.

Fig. 1 illustrates the general features of a heavy dump truck including a frame 10, a tiltable body 11, power means 12 for dumping, an operator's cab 13, a steering wheel 14, steering linkage 15 (in broken line) a "wishbone" connection 16 between the front axle 17 and the frame 10, the wishbone and frame being connected through a ball joint 18, and a dual transverse spring suspension 19 to be first described, and better shown in Figs. 2, 3 and 4.

The spring suspension

The front axle 17 carries its appropriate share of the sprung weight in the following manner. A pair of identical semielliptical springs 23, 24 extend transversely, closely adjacent to the front axle, one in front and one in the rear of said axle. The spring suspension construction is the same at each of the two respectively paired ends of said springs, and a description of one end will suffice. Referring particularly to Figs. 2 and 4, the adjacent ends of the longest spring leaves 23a, 24a of each pair are secured around bushings on the shackle bolts 25, which are oscillatable by shackle arms 25a about pin 29. Axle 17 has fixed thereon a saddle bracket 26 carrying a vertically spaced pair of bored bosses 27 and 28. A common shackle pin 29 passes through boss 27 and supports, on its opposed ends the shackles for both springs.

The threaded tops 32 of the U bolts 31 which clamp the free mid portions of the pair of springs 23 and 24, likewise retain thereon a pair of aligned trunnions 33, 34 (Fig. 3) which provide bearings for a main suspension pin 35. The weight of the frame 10 is applied to and carried on the suspension pin 35 through a cradle bracket 36 having downwardly extending yoke flanges 37 which are integral with a suspension bushing 38 rotatable on pin 35.

It will be apparent, therefore, that the sprung weight of the front portion of the vehicle is carried and distributed in a balanced arrangement comprising the pair of transverse springs paralleling the front axle. This permits the necessary flexibility without sacrifice of stability, and each individual spring supports only one half of the total load. The opposed shackle arrangement, including arms 25a, and the rotatability of the trunnion caps around the main suspension pin provide the maximum amount of flexibility.

The stabilizing means

We have provided novel stabilizing means for preventing harmful lateral displacement of the center of suspension with respect to the mid point of the axle. Such displacement might occur, for example, if the vehicle travels around a curve at relatively high speed, or if the vehicle is tipped so that one side is materially higher than the other. Stabilization is effected by linking the suspension pin 35 to one end of the axle in such manner as to prevent lateral shifting movement of the suspension pin, but to permit vertical movement of the inner end of said pin responsive to spring flexure.

Linkage of the axle to the suspension pin is effected by means of a stabilizing member or bar 40. Connection to the axle is made at the outer end of the bar which has a forked yoke 41 provided with bored arms accommodating a pin 42, said pin being rotatable in the previously mentioned boss 28 on saddle bracket 26 affixed to the axle. The inner end of the bar carries a split block 43 enclosing a bushing or bearing which is rotatable around the main suspension pin 35, within the frame supporting means 37.

Fig. 4 clearly illustrates the adaptability of the stabilizing structure to extreme flexure of the springs which might result, for example, when the wheel passes over an obstruction. The pivotal connection at both ends of the stabilizing bar 40 permits movement of the axle and connected elements from the full line position to the dotted line position while securely maintaining the suspension pin 35, and thereby the spring centers, in vertical alignment with the mid point of the axle. This preserves the stability of the load and prevents destructive shocks to the spring shackles without affecting the capacity of the springs to flex freely.

Referring to Fig. 4, it will be noted that the vertical distance between the frame supporting means pivot 35 and the bottom horizontal leaf 23a of the spring 23 is substantially equal to the vertical distance between the outer end of the stabilizing arm 40 as indicated at the pin 42 and the shackle link connectors 25a beneath the outer end of arm 40. It will be remembered that the pin 25 connects the leaf 23a to the shackle link. Since each of the stabilizing arms 40 extends from the pin 35 in the middle of spring 23 to the outer end thereof and each arm is equal to about one-half of the length of the longest leaf 23a of the spring, there results a parallelogram of forces during spring flexing as is indicated by the dot-dash lines of Fig. 4.

Traction drive for front axle

Lateral alignment of the front axle with respect of the frame has just been described. We have also provided novel means for maintaining longitudinal alignment of the axle and frame, and for applying tractive effort to the axle.

This means is shown as a V brace, hereinbefore descriptively termed a "wishbone," and comprises a pair of rigid structural members 51 and 52 fixed at their rear ends to saddle brackets 26 on the front axle 17, and extending forwardly and converging to an apex or union at 53 (Figs. 2 and 3). A universal joint 18 is provided for uniting the wishbone apex and the frame. Extending upwardly from the wishbone apex is a stud 54 having a ball top 55 which is nested in a socket bearing 56 depending from frame 10. To permit free, spring-suspended rock of the frame with respect to the wishbone and axle, the center of rotation of the ball joint is in rectilinear alignment with the axis of the main suspension pin 35, as indicated by the broken line 57 in Fig. 3. Driving tension is thereby applied to the front axle from the front portion of the frame, and the sprung weight of the vehicle may rock or sway without any twisting stresses on the wishbone.

At their rear ends the wishbone members 51 and 52 carry upwardly extending bumper flanges 58 and 59 which, in case of extreme vehicle frame sway, make contact with the under surface of the frame supporting cradle 36. In such case, as indicated by the broken line position in Fig. 4, clearance for the stabilizer bar 40 is provided by an arched recess 60 in the cradle 36, so that the stabilizer bar takes no impact.

If desired, scraper means 61 (Fig. 3) may be suspended from the wishbone members 51 and 52 for dirt clearing, or other purposes, and the scraper protects various underframe elements from injury. This scraper will throw loose dirt on a fill or the like approximately as far laterally as the front wheels, which pack it down.

The steering linkage

We have provided novel and improved steering linkage which eliminates "fight," or resistance to steering wheel manipulation, in practically all positions except those at the extreme limits of angular turn, where the speed is necessarily slow. This is accomplished by substituting for the conventional drag link, which normally is inclined to the horizontal and which extends from the pitman steering arm to the steering knuckle arm, a pair of links mutually connected through an intermediate rocking or relay lever. Said links and rocking lever are all movable in a horizontal plane, the alignment of the links and lever being such as to facilitate the steering.

Referring particularly to Figs. 1 and 2, the pitman steering arm 63 extends forwardly and downwardly to a pivotal connection with a primary drag link 64. Note that the end of arm 63 swings substantially in a vertical plane. The steering knuckle arm 65 is pivoted to a secondary drag link 66 at 67. The adjacent ends of the primary and secondary drag links are pivotally connected at 68 and 69 respectively to the opposed ends of a rocking lever 70. Lever 70, near its mid point, is pivoted to the frame at 71. Drag links 64 and 66 and lever 70 all lie substantially in the same horizontal plane. The moments of the force effective through lever 70 are such as to be applied respectively by links 64 and 66 substantially at right angles on the lever 70 and the steering knuckle arm 65 at the respective pivots 68 and 67 when the front wheels are disposed for straight forward movement, the position of the lever 70 then being as shown in full line in Fig. 2. It will be apparent that moderate changes in direction from the full line position to the dotted line positions in Fig. 2 can be effected with great ease of movement of the steering wheel by reason of the angular positional relationships of the drag links, the rocking lever, and the steering knuckle arm, all such elements being in the same plane so as to be fully effective, each one on the adjoining one. It will be further noted that in the Fig. 2 position of the steering linkage, the fixed pivot 71 of the rocking lever, and the movable pivot 69 are in linear alignment both with the wishbone ball joint 55, 56 and the axis of the suspension pin 35, when the wheels are disposed for straight forward travel. The arrangement of tie rod 72 and steering knuckle arms are fairly conventional, as is apparent from a glance at Fig. 2, so that further description is unnecessary.

Operation of the steering linkage is apparent from a study of Fig. 2. The full line position of the elements 64, 65, 66, and 70 illustrates the disposition of the parts when the vehicle is running in a straight forward path. In the dot-dash line position the steering wheel has been operated to turn the front wheels almost to the limit of swing in one direction, and in the dotted line position the front wheels have been swung part way towards the limit of swing in the other direction.

What we claim is:

1. A spring suspension of the character described for a vehicle, comprising a vehicle frame, an axle, a pair of semielliptical leaf springs disposed transversely with respect to the frame, one spring on each side of, and adjacent to, said axle, each leaf spring having a respective shackle link pivotally attached to each of the opposed ends thereof, each said shackle link being likewise pivotally attached to the respectively adjacent end portion of said axle, and frame supporting means carried by and linking the mid points of said pair of springs, said frame supporting means comprising a pair of trunnion bearings carried one on the mid point of each spring, a suspension pin journaled at its ends in said bearings, the mid portion of said pin bridging the space between said springs above said axle, means fixed to said frame and carried on said mid portion of said pin, and stabilizing means for maintaining vertical alignment between said suspension pin and the mid point of said axle, said stabilizing means comprising a bar extending from one end portion of said axle inwardly towards said suspension pin, said bar being pivotally connected at its outer end to said end portion of said axle, and at its inner end to said suspension pin.

2. Spring suspension and spring stabilizing mechanism of the character described, and adapted for use in a vehicle having a frame resiliently supported on an axle, said spring suspension comprising a pair of multiple leaf springs disposed transversely with respect to the frame, one spring on each side of, and adjacent to, said axle, each leaf spring having a respective shackle link pivotally attached to each of the opposed ends thereof, a pair of saddle brackets one adjacent each end of and fixed to said axle, each said saddle bracket carrying shackle pin means pivotally supporting the pair of shackle links adjacent thereto, a pair of trunnion bearings, one carried on the mid portion of each spring, a frame suspension pin journaled at its ends in said bearings, the mid portion of said suspension pin supporting said frame and bridging the space between said springs above said axle, and spring stabilizing mechanism for maintaining vertical alignment between said suspension pin and the mid point of said axle, said stabilizing mechanism comprising a bar extending from one end portion of said axle inwardly towards said suspension pin, said bar being pivotally connected at its outer end to one of said saddle brackets, and at its inner end to said suspension pin.

3. A spring suspension of the character described for a vehicle comprising a vehicle frame, an axle, semielliptical leaf spring means disposed transversely of said frame and generally parallel to said axle and having its opposed ends swingable, shackle link connectors pivotally connected to said ends and to the respectively adjacent end portions of said axle, said spring means having a substantially horizontal bottom leaf and shorter leaves thereabove, frame supporting means including a pivot on a fore-and-aft axis connected with the midportion of said spring means whereby said vehicle is resiliently carried on said axle, a stabilizing arm having its outer end pivotally connected with one end portion of said axle above one of said shackle link connectors, said arm having its inner end pivotally connected to said frame supporting means pivot, and the vertical distance between said frame supporting means pivot and said horizontal leaf being substantially equal to the vertical distance between the outer end of said arm and the shackle link connectors beneath it and said arm being substantially equal in length to one-half of said horizontal leaf whereby a parallelogram of forces is provided during the flexing of said spring.

4. In a land vehicle, a frame, front and rear wheel means supporting said frame, means for driving said rear wheel means, a front axle connecting said front wheel means, a V-shape wishbone extending forwardly from spaced points on said axle and converging forwardly to an apex, the rear ends of said wishbone being rigidly connected with said axle, pivot means having a pivotal axis extending in a fore-and-aft direction and connecting said axle to said frame for axle oscillation about said axis, a universal joint connection between said frame and said apex providing a fore-and-aft pivotal axis fixed relative to said frame, and said two pivotal axes being substantially in alinement.

5. The combination of claim 4, including resilient support means between said axle and said frame, and wherein said first named pivotal axis is spaced above said axle, two stabilizing arms above and parallel to said axle extending laterally in opposite directions from said first named pivotal axis, means connecting the inner ends of said arms to said frame for pivotal movement about said first named pivotal axis, and bracket means connecting the outer end of each of said arms a fixed distance vertically above said axle, each said bracket means connection including a pivot extending in a fore-and-aft direction.

6. The combination of claim 4, including leaf spring means disposed transversely of said frame and generally parallel to said axle, means securing the central portion of said spring means to said pivot means, shackle links connecting the outer ends of said spring means to said axle, said first named pivotal axis being spaced above said axle, two stabilizing arms above and parallel to said axle extending laterally in opposite directions from said first named pivotal axis, means connecting the inner ends of said arms to said frame for pivotal movement about said first named pivotal axis, and bracket means connecting the outer end of each of said arms a fixed distance vertically above said axle, each said bracket means connection including a pivot extending in a fore-and-aft direction.

ROGER L. CAMILLY.
ORPHEUS F. QUARTULLO.

REFERENCES CITED

The following references are of record in the file of this patent:

UNITED STATES PATENTS

| Number | Name | Date |
|---|---|---|
| 646,728 | Crouch | Apr. 3, 1900 |
| 810,673 | Rae | Jan. 23, 1906 |
| 869,583 | Macfarren | Oct. 29, 1907 |
| 1,136,503 | Baucom | Apr. 20, 1915 |
| 1,249,696 | Waite | Dec. 11, 1917 |
| 1,288,757 | Timm | Dec. 24, 1918 |
| 1,348,512 | Mills | Aug. 3, 1920 |
| 1,798,077 | Garner | Mar. 24, 1931 |
| 1,995,500 | Dillon | Mar. 26, 1935 |
| 2,206,970 | Megow | July 9, 1940 |
| 2,355,204 | Couse | Aug. 8, 1944 |
| 2,364,842 | Feigelson | Dec. 12, 1944 |